(12) United States Patent
Takeuchi et al.

(10) Patent No.: US 11,644,102 B2
(45) Date of Patent: May 9, 2023

(54) THROTTLE VALVE DEVICE AND METHOD FOR MANUFACTURING THROTTLE VALVE DEVICE

(71) Applicants: DENSO DAISHIN CORPORATION, Tokoname (JP); DENSO CORPORATION, Kariya (JP)

(72) Inventors: Kota Takeuchi, Tokoname (JP); Toru Shimizu, Tokoname (JP); Satoshi Nagasaka, Tokoname (JP); Katsuhisa Saito, Tokoname (JP)

(73) Assignees: DENSO DAISHIN CORPORATION, Tokoname (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 17/685,484

(22) Filed: Mar. 3, 2022

(65) Prior Publication Data

US 2022/0412466 A1     Dec. 29, 2022

(30) Foreign Application Priority Data

Jun. 29, 2021  (JP) .............................. JP2021-108007

(51) Int. Cl.
*F16K 1/22* (2006.01)
*F16K 31/04* (2006.01)
*F02D 9/10* (2006.01)

(52) U.S. Cl.
CPC .............. *F16K 1/221* (2013.01); *F02D 9/107* (2013.01); *F16K 1/222* (2013.01); *F16K 1/224* (2013.01); *F16K 31/043* (2013.01)

(58) Field of Classification Search
CPC .......... F16K 1/221; F16K 1/222; F16K 1/224; F16K 31/043; F02D 9/107

USPC ......................... 251/129.11–129.13, 305–308
See application file for complete search history.

(56) References Cited

U.S. PATENT DOCUMENTS

| | | | | |
|---|---|---|---|---|
| 1,841,695 A | * | 1/1932 | Anderson ................. | F16K 1/22 251/308 |
| 2,105,343 A | * | 1/1938 | Briggs ...................... | F16K 1/22 251/308 |
| 5,342,019 A | * | 8/1994 | Braun ...................... | F02B 37/22 251/305 |
| 5,746,177 A | * | 5/1998 | Criss ......................... | F02D 9/10 251/308 |
| 5,979,871 A | * | 11/1999 | Forbes .................. | F02D 9/1045 251/305 |
| 6,352,241 B1 | * | 3/2002 | Hannewald ............. | F02D 9/104 251/305 |

(Continued)

FOREIGN PATENT DOCUMENTS

JP    2004-153914    5/2004

*Primary Examiner* — John Bastianelli
(74) *Attorney, Agent, or Firm* — Nixon & Vanderhye P.C.

(57) ABSTRACT

A throttle valve device includes a shaft in a cylindrical passage, a slit passing through the shaft from one lateral side to another lateral side of the shaft, a pair of bearings on both sides of the cylindrical passage and rotatably supporting one end part and another end part of the shaft, and a circular-plate valve inserted into the slit of the shaft and rotatable to open and close the cylindrical passage. A length of the slit on the one lateral side of the shaft is, in an axial direction of the shaft, longer than a length of the slit on the other lateral side of the shaft. A round end hole is formed at an end of the slit in the one end part of the shaft on the one lateral side of the shaft.

7 Claims, 8 Drawing Sheets

(56) References Cited

U.S. PATENT DOCUMENTS

6,874,466 B2 * 4/2005 Shibata ................... F02D 9/106
251/308

* cited by examiner

THROTTLE VALVE DEVICE AND METHOD FOR MANUFACTURING THROTTLE VALVE DEVICE

CROSS REFERENCE TO RELATED APPLICATION

This application is based on and incorporates herein by reference Japanese Patent Application No. 2021-108007 filed on Jun. 29, 2021.

TECHNICAL FIELD

The present disclosure relates to a throttle valve device and a method for manufacturing a throttle valve device.

BACKGROUND

An electronic throttle device includes a valve and a shaft. The valve is inserted into a slit provided on the shaft, and the valve is fixed to the shaft by screwing.

SUMMARY

A throttle valve device according to at least one embodiment of the present disclosure includes a body, a shaft, a slit, a pair of bearings, a screw hole, a valve, and a motor. The body has a cylindrical passage and a motor space. The shaft is arranged in and orthogonal to the cylindrical passage of the body. The slit passes through the shaft on a central axis of the shaft from one lateral side to another lateral side of the shaft. The pair of bearings are provided on both sides of the cylindrical passage and rotatably supporting one end part and another end part of the shaft. The slit is between the pair of bearings. The screw hole is provided in the shaft and extends in a direction orthogonal to the slit. The valve has a circular plate shape and is inserted into the slit of the shaft. The valve is screwed to the shaft via the screw hole and rotatable together with the shaft to open and close the cylindrical passage. The motor is held in the motor space of the body and rotates the shaft via a speed reduction mechanism in response to an electric signal. An outer diameter of the valve is substantially the same as an inner diameter of the cylindrical passage. A width of the slit is substantially the same as a thickness of the valve. A length of the slit on the other lateral side of the shaft is, in an axial direction of the shaft, longer than a length of the slit on the one lateral side of the shaft. A round end hole is formed at least at an end of the slit in the one end part of the shaft on the one lateral side of the shaft.

At least one embodiment of the present disclosure is a method for manufacturing a throttle valve device having a valve that opens and closes a cylindrical passage. The manufacturing method includes forming a round end hole in a shaft, forming a slit in the shaft, attaching a pair of bearings and the shaft to a body, and inserting a valve into the slit. At the forming the round end hole, the round end hole is formed on one lateral side of the shaft in at least one end part of the shaft. At forming the slit, the slit is formed to pass through the shaft on a central axis of the shaft. The forming the slit includes moving a cutter having a disk shape from another lateral side of the shaft to the one lateral side of the shaft while rotating the cutter such that a cutting blade of the cutter moves in a direction from the one end part toward another end part of the shaft. A diameter of the cutter is larger than a diameter of the valve by 10% to 40% of the diameter of the valve. At the attaching the pair of bearings and the shaft, the pair of bearings and the shaft are attached to the body defining the cylindrical passage such that the shaft is orthogonal to the cylindrical passage, the pair of bearings rotatably support the shaft on both sides of the cylindrical passage, and at least a part of the round end hole is covered by the body. At the inserting the valve, the valve is inserted into the slit such that the valve is rotatable together with the shaft. The valve has a circular plate shape with a thickness substantially the same as a width of the slit. The forming the round end hole and the forming the slit are performed such that a diameter of the round end hole becomes equal to the width of the slit or lager than the width of the slit by 30% of the width of the slit or less, a depth of the round end hole from the one lateral side of the shaft in a radial direction of the shaft becomes deeper than a depth at which the round end hole contacts the slit, and an angle between an inner surface of an end of the slit and the round end hole becomes a predetermined angle.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

An electronic throttle device of a comparative example has a fixing structure of a motor. However, in terms of assembly of a valve and a shaft, the valve is just inserted into a slit provided on the shaft, and the valve is fixed to the shaft by screwing. This is because intake air needs to be prevented from leaking between the valve and the slit while the valve is an important component for adjusting a flow rate of the intake air. Therefore, it has been assumed that the shape of the slit should be substantially the same as the outer shape of the valve, and it has not been considered that the shape of the slit can be changed.

The present disclosure can reduce generation of burrs around a slit and reduce leakage from between a valve and the slit by devising the shape of the slit. A throttle valve device according to the present disclosure may be applicable, for example, in an electronic throttle device for controlling intake air of an engine, an EGR valve used in an exhaust gas circulation system, a pressure control valve of an intake passage for a diesel engine, and a negative pressure control valve for controlling a hydrogen concentration of a fuel cell.

A throttle valve device according to a first aspect of the present disclosure includes a body, a shaft, a slit, a pair of bearings, a screw hole, a valve, and a motor. The body has a cylindrical passage and a motor space. The shaft is arranged in and orthogonal to the cylindrical passage of the body. The slit passes through the shaft on a central axis of the shaft from one lateral side to another lateral side of the shaft. The pair of bearings are provided on both sides of the cylindrical passage and rotatably supporting one end part and another end part of the shaft. The slit is between the pair of bearings. The screw hole is provided in the shaft and extends in a direction orthogonal to the slit. The valve has a circular plate shape and is inserted into the slit of the shaft. The valve is screwed to the shaft via the screw hole and rotatable together with the shaft to open and close the cylindrical passage. The motor is held in the motor space of the body and rotates the shaft via a speed reduction mechanism in response to an electric signal.

An outer diameter of the valve is substantially the same as an inner diameter of the cylindrical passage. A width of the slit is substantially the same as a thickness of the valve. A length of the slit on the other lateral side of the shaft is, in an axial direction of the shaft, longer than a length of the slit on the one lateral side of the shaft. A round end hole is formed at least at an end of the slit in the one end part of the shaft on the one lateral side of the shaft.

According to the first aspect of the present disclosure, since the round end hole is formed, formation of burrs at the end of the slit in the one end part on the one lateral side can be reduced. That is, since an angle between an inner surface of the end of the slit and the round end hole is a predetermined angle, the burr formation at least in the one end part on one lateral side of the shaft can be reduced. According to a second aspect of the present disclosure, the angle between the inner surface of the end of the slit in the one end part and the round end hole is in a range from 100 to 150 degrees. Since the angle is in the range from 100 to 150 degrees, the burr formation can be effectively reduced.

According to a third aspect of the present disclosure, a diameter of the round end hole is equal to a width of the slit or lager than the width of the slit by 30% of the width of the slit or less. A depth of the round end hole from the one lateral side of the shaft in a radial direction of the shaft is deeper than a depth at which the round end hole contacts the slit. Since the round end hole has such size, the burr formation can be effectively reduced.

According to a fourth aspect of the present disclosure, at least a part of the round end hole is covered by the body. As a result, leakage from the round end hole can be reduced.

According to a fifth aspect of the present disclosure, the angle between the inner surface of the end of the slit in the one end part and the round end hole is 120 degrees or more. Since the angle between the inner surface of the end of the slit and the round end hole is 120 degrees or more, occurrence of burrs can be substantially eliminated.

According to a sixth aspect of the present disclosure, a lever is fixed to the one end part or the other end part of the shaft, and located outward of the pair of bearings. The lever transmits rotation of the speed reduction mechanism to the shaft. The fixing of the lever is performed by press-fitting or swaging after insertion. During the fixing of the lever, stress is applied to the slit, but the round end hole can prevent stress concentration.

A seventh aspect of the present disclosure is a method for manufacturing a throttle valve device having a valve that opens and closes a cylindrical passage. The manufacturing method includes forming a round end hole in a shaft, forming a slit in the shaft, attaching a pair of bearings and the shaft to a body, and inserting a valve into the slit. At the forming the round end hole, the round end hole is formed on one lateral side of the shaft in at least one end part of the shaft. At forming the slit, the slit is formed to pass through the shaft on a central axis of the shaft. The forming the slit includes moving a cutter having a disk shape from another lateral side of the shaft to the one lateral side of the shaft while rotating the cutter such that a cutting blade of the cutter moves in a direction from the one end part toward another end part of the shaft. A diameter of the cutter is larger than a diameter of the valve by 10% to 40% of the diameter of the valve. At the attaching the pair of bearings and the shaft, the pair of bearings and the shaft are attached to the body defining the cylindrical passage such that the shaft is orthogonal to the cylindrical passage, the pair of bearings rotatably support the shaft on both sides of the cylindrical passage, and at least a part of the round end hole is covered by the body. At the inserting the valve, the valve is inserted into the slit such that the valve is rotatable together with the shaft. The valve has a circular plate shape with a thickness substantially the same as a width of the slit. The forming the round end hole and the forming the slit are performed such that a diameter of the round end hole becomes equal to the width of the slit or lager than the width of the slit by 30% of the width of the slit or less, a depth of the round end hole from the one lateral side of the shaft in a radial direction of the shaft becomes deeper than a depth at which the round end hole contacts the slit, and an angle between an inner surface of an end of the slit and the round end hole becomes a predetermined angle.

According to the seventh aspect of the present disclosure, the round end hole is formed at least in the one end part of the shaft between the pair of bearings, and, the slit is formed by the disk-shaped cutter. In particular, a diameter of the round end hole is equal to a width of the slit or lager than the width of the slit by 30% of the width of the slit or less. A depth of the round end hole from the one lateral side of the shaft in a radial direction of the shaft is deeper than a position at which the round end hole contacts the slit. Then, the diameter of the cutter is set 10% to 40% larger than the diameter of the valve. The rotation direction of the disk-shaped cutter is the direction in which the cutting blade moves from the one end part to the other end part of the shaft. The moving direction of the cutter is from the other lateral side to the one lateral side. The disk-shaped cutter forms the slit so that the angle between the inner surface of the end of the slit and the round end hole becomes the predetermined angle. The combination of these steps can form the slit while reducing the burr generation in the one end part of the shaft between the pair of bearings on the one lateral side of the shaft. Accordingly, generation of burrs having high height can be reduced.

According to the seventh aspect of the present disclosure, when the bearings and the shaft are attached to the body, at least a part of the round end hole is covered by the body. As a result, leakage from the round end hole can be reduced.

According to an eighth aspect, a lever is fixed to the one end part or the other end part of the shaft such that the lever is located outward of the pair of bearings in the axial direction of the shaft. The lever transmits rotation of the speed reduction mechanism to the shaft. The fixing the lever is performed after screwing the valve to the shaft and before incorporating a motor into a motor space of the body. As described above, since the lever is fixed by press-fitting or swaging after insertion, stress is applied to the slit in the fixing process of the lever. However, stress concentration can be prevented by the round end hole.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

An embodiment will be described below with reference to the drawings, in which a throttle valve device of the present disclosure is applied to an electronic throttle device. As described above, the throttle valve device of the present disclosure can be widely used as a throttle valve device such as an EGR valve, a pressure control valve for an intake passage of a diesel engine, and a negative pressure control valve for a fuel cell. Therefore, names such as a "throttle shaft" and a "throttle valve" described below are just examples in use of the present disclosure in the electronic throttle device, but the uses of the shaft and the valve are not limited to the throttle.

Figure 1:
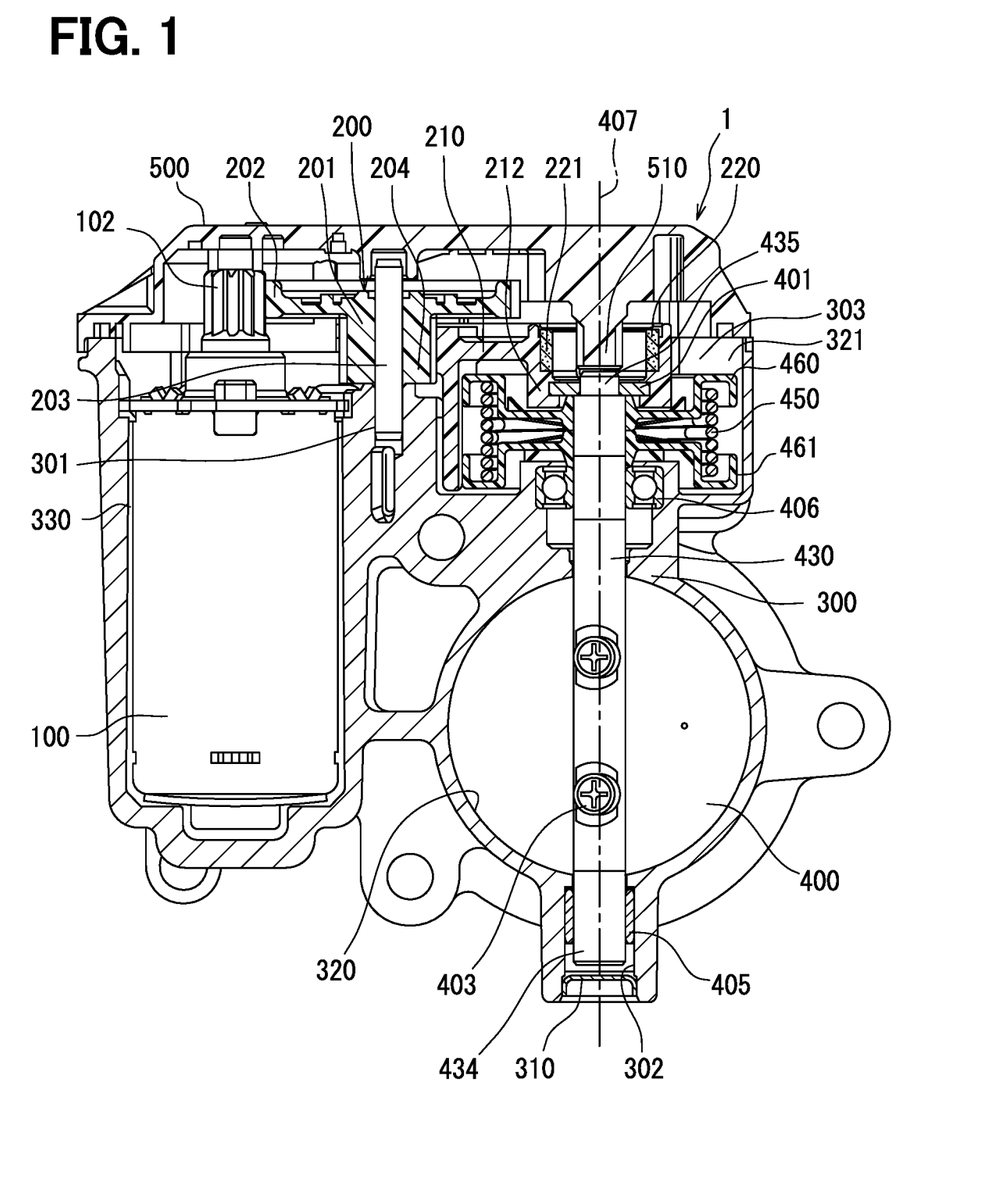
FIG. 1 is a cross-sectional view of an electronic throttle device.

FIG. 1 is a vertical cross-sectional view of the electronic throttle device 1. An overview of the electronic throttle device 1 will be described with reference to FIG. 1. The electronic throttle device 1 is arranged in an engine compartment and controls a flow rate of an intake air taken into an engine. An engine control unit (not shown) calculates an optimum intake amount in accordance with, for example, a driver's accelerator pedal operation and an engine rotation state, and outputs a rotation rate to a motor 100 according to the calculation results.

Figure 3:
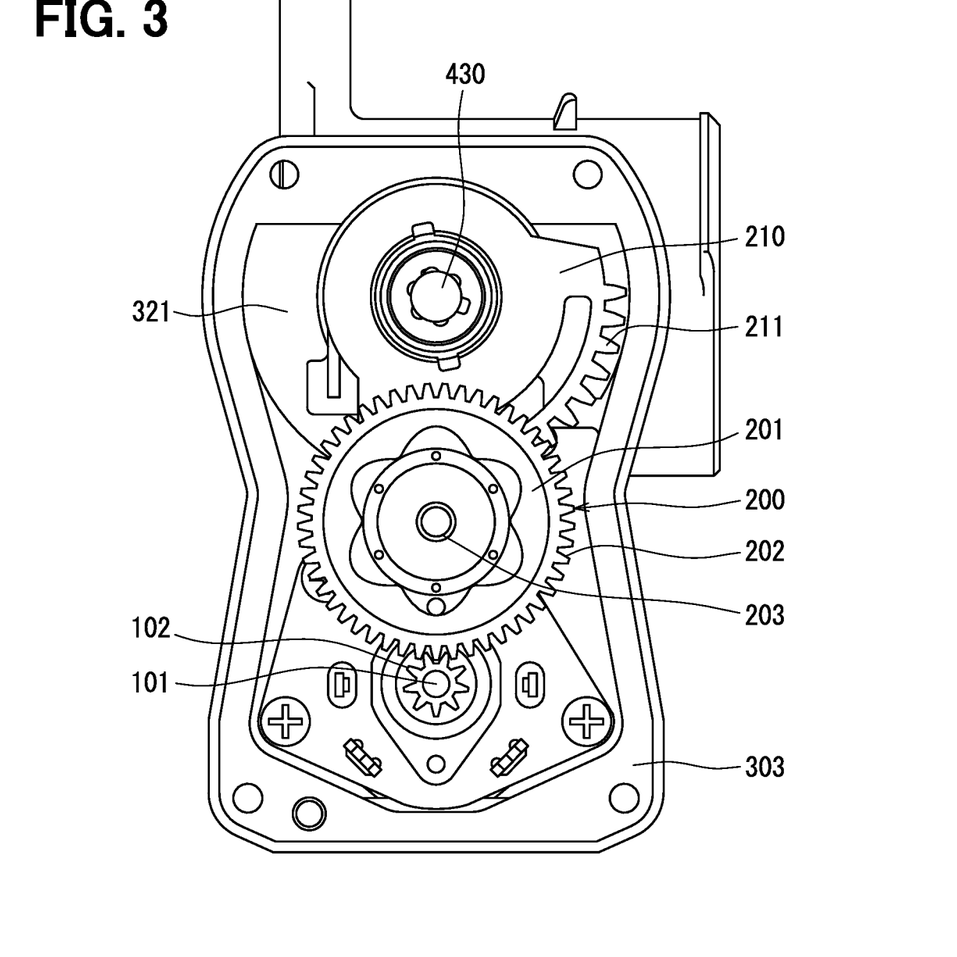
FIG. 3 is a side view of a body.

The motor 100 is arranged in a motor space 330 of a body 300 made of aluminum or an aluminum alloy. Rotation of the motor 100 is transmitted to the speed reduction mechanism 200 via a motor pinion 102 press-fitted and fixed to a motor shaft 101 (shown in FIG. 3). As shown in FIG. 3, the speed reduction mechanism 200 includes the motor pinion 102, an intermediate gear 201, and a valve gear 210.

A large-diameter gear 202 of the intermediate gear 201 meshes with the motor pinion 102. The intermediate gear 201 is held to be rotatable about an intermediate shaft 203. The intermediate shaft 203 is made of stainless steel and is press-fitted into and fixed to a fitting hole 301 of the body 300.

A small-diameter gear 204 of the intermediate gear 201 meshes with a teeth portion 211 that is formed in an arc shape on an outer circumferential surface of the valve gear 210. Rotation of the motor pinion 102 is transmitted to the valve gear 210 via the intermediate gear 201. The reduction rate of the speed reduction mechanism 200 is set, for example, such that the teeth portion 211 of the valve gear 210 advances clockwise or counterclockwise by one tooth per 28 rotations of the motor shaft 101.

Magnets 220 and 221 having semicircular arc shapes are arranged in an inner circumference of a cup center portion 212 of the valve gear 210, and the magnets 220 and 221 form a magnetic circuit. A lever 401 having a circular-plate shape is disposed in a deep portion (the lower side in FIG. 1) of the cup center portion 212 of the valve gear 210. The magnets 220 and 221 and the lever 401 are insert-molded with the valve gear 210.

The lever 401 is fixed to an end face of a throttle shaft 430. This fixing is performed by press fitting or swaging after insertion. Therefore, the valve gear 210 is connected to the throttle shaft 430 via the lever 401, and rotation of the valve gear 210 is transmitted to the throttle shaft 430. A throttle valve 400 having a circular-plate shape is fixed to the throttle shaft 430 by a screw 403. The throttle valve 400 increases or decreases an opening area of an intake passage 320 according to rotation of the throttle valve 400. The intake passage 320 is formed in the body 300 and has a cylindrical shape. In the electronic throttle device 1, the intake passage 320 corresponds to a cylindrical passage. The throttle shaft 430 is made of stainless steel, and the throttle valve 400 is made of aluminum or an aluminum alloy.

An open end 303 of the body 300 (the upper side in FIG. 1, the front side in FIG. 3) is covered by a cover 500. The cover 500 is formed of a resin such as polybutylene terephthalate (PBT), and ribs are provided at specified locations to increase its strength. A connector 501 shown in FIG. 2 includes a power supply line connected to the motor 100, and a power line and a signal line connected to a rotation angle sensor 510. A screw 502 fixes the cover 500 to the body 300.

Figure 2:
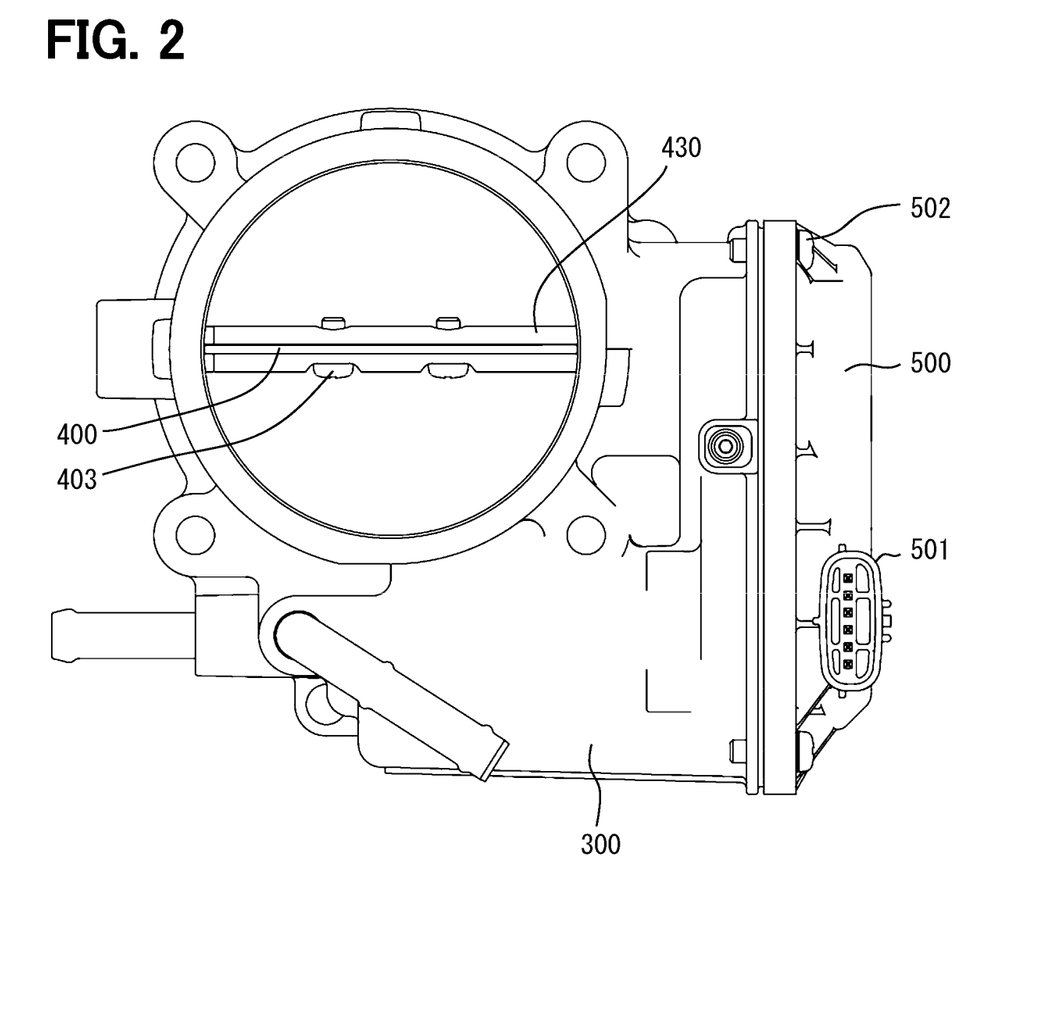
FIG. 2 is a front view of the electronic throttle device.

A pair of rotation angle sensors 510, which are Hall ICs, are disposed in the cover 500 at positions corresponding to an axis 407 of the throttle shaft 430. The rotation angle sensors 510 are fixed to the cover 500. The pair of arc-shaped magnets 220 and 221 which have been insert-molded on the valve gear 210 are arranged on an outer periphery of the rotation angle sensors 510. Since the magnets 220 and 221 rotate around the axis 407 according to the rotation of the throttle shaft 430, the magnetic circuit changes in position according to a rotation angle of the throttle valve 400. The rotation angle sensors 510 detect a change in magnetic force caused by the positional change of the magnetic circuit, thereby detecting an opening degree of the throttle valve 400. Then, the detected position information is fed back to an engine control unit (not shown).

The throttle shaft 430 is rotatably supported in the body 300 by bearings 405 and 406 arranged on opposite sides of the throttle valve 400. The bearing 405 is a plain bearing, and the bearing 406 is a ball bearing. An opening 302 of the body 300 is an opening for the bearing 405 to be inserted and is covered by a plug 310.

Figure 5:
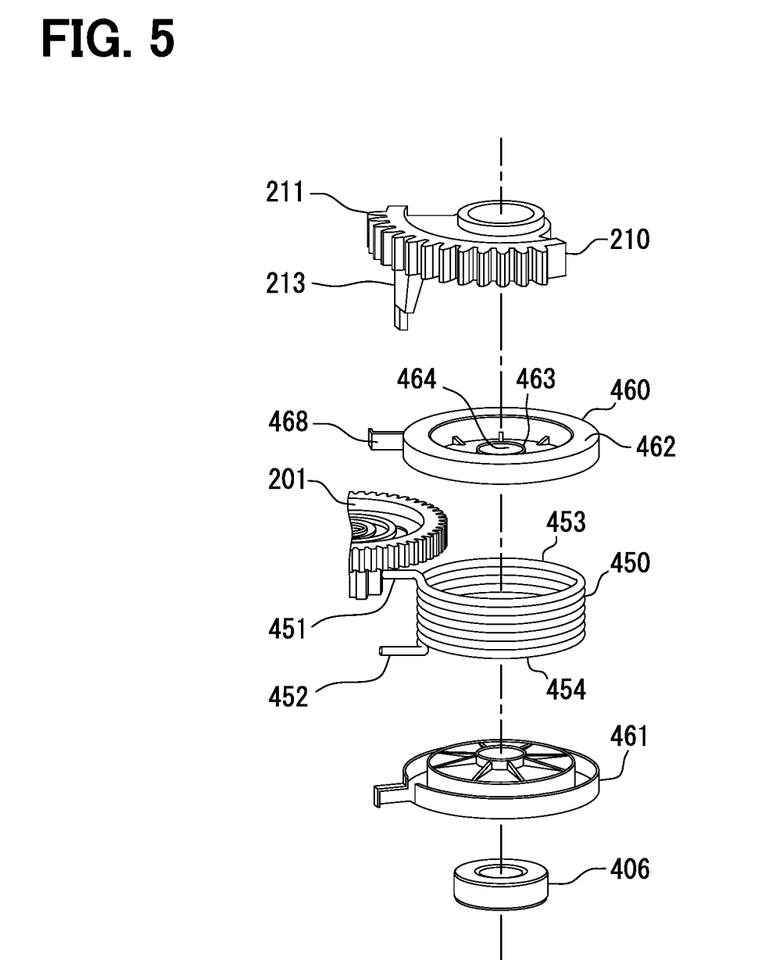
FIG. 5 is a perspective view showing a coil spring, a first guide, and a second guide.

The body 300 has a space 321 for housing the valve gear 210, and a coil spring 450 for urging the throttle shaft 430 is arranged in this space 321. The coil spring 450 is made of spring steel and has a cylindrical shape with a diameter of about 15 mm as shown in FIG. 5. One spring end 451 and another spring end 452 are bent outward in a radial direction and protrude outward by about 5 mm.

One end surface 453 of the coil spring 450 is covered by a first guide 460. Another end surface 454 of the coil spring 450 is covered by a second guide 461. Both the first guide 460 and the second guide 461 are made of nylon 66 resin. Hereinafter, the first guide 460 will be described.

The first guide 460 includes an annular portion 462 that covers the one end surface 453 of the cylindrical coil spring 450. Then, the one end surface 453 of the coil spring 450 is housed in the annular portion 462. The first guide 460 has a hub 463 provided in the center of the annular portion 462, and the throttle shaft 430 is loosely fitted in a center hole 464 of the hub 463. In other words, the first guide 460 is disposed rotatably around the throttle shaft 430.

The first guide 460 has a guide hook 468 that protrudes radially outward from the annular portion 462. The above-description is regarding the first guide 460. The second guide 461 has the same shape as the first guide 460, and thus the description of the first guide 460 can be applied to the second guide 461.

Since the first guide 460 and the second guide 461 have the same shape, it is not necessary to classify the first guide 460 and the second guide 461 at the time of assembling, and as a result, assembling time can be reduced. In addition, by having the same shape, the cost of an assembling equipment can be reduced and the cost of components can be reduced.

As shown in FIG. 1, the first guide 460, the coil spring 450, and the second guide 461 are arranged around the throttle shaft 430 on a back surface (the lower side in FIG. 1) of the valve gear 210. Then, the hub 463 of the first guide 460 is brought into contact with the metal lever 401, and a hub 463 of the second guide 461 is brought into contact with an inner race of the ball bearing (bearing 406).

Figure 4:
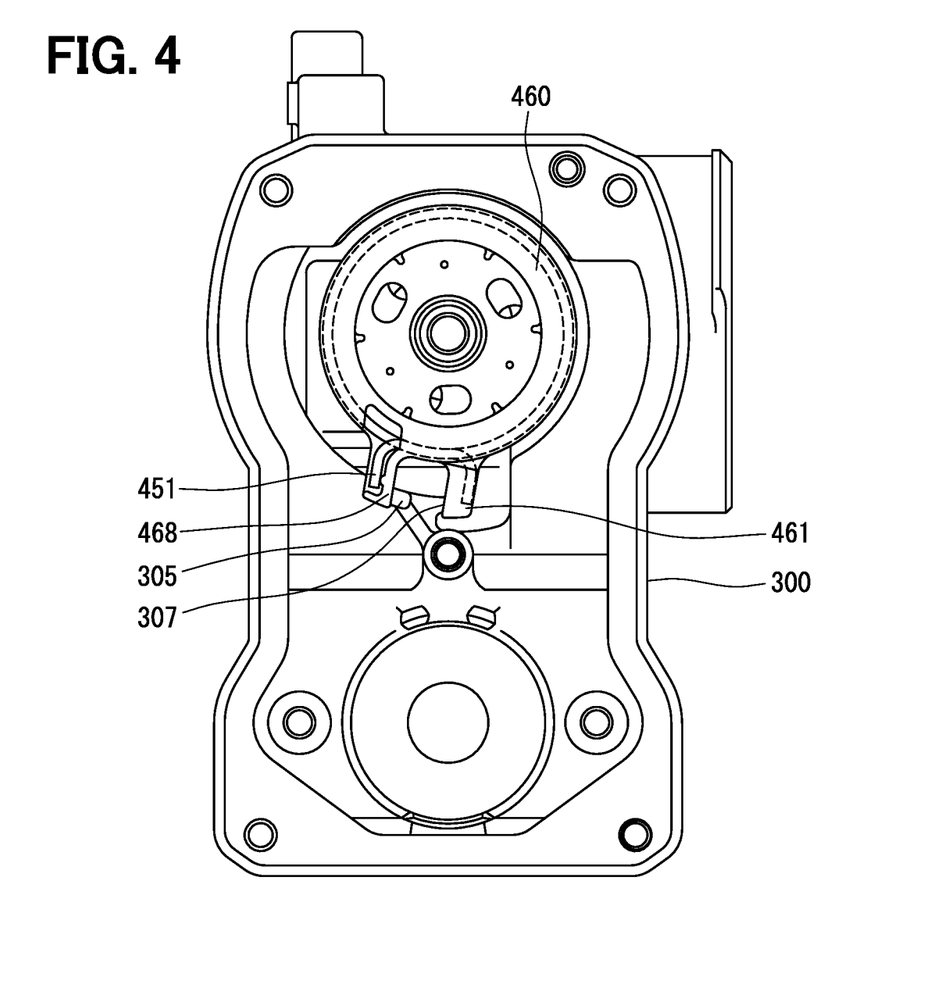
FIG. 4 is a side view of the body without a speed reduction mechanism.

As shown in FIG. 4, the body 300 includes a body hook 305 capable of contacting the guide hook 468 of the first guide 460, and a body hook 307 capable of contacting a guide hook 468 of the second guide 461. Then, in a state where the guide hooks 468 are in contact with the body hooks 305 and 307, the throttle valve 400 holds the intake passage 320 at an intermediate opening degree due to the urging force of the coil spring 450. Although this intermediate opening degree corresponds to a closed position, the throttle valve 400 does not fully close the intake passage 320 so as to allow an evacuation travel in case of malfunction. That is, the intake passage 320 is slightly open so that a predetermined amount of intake air can flow in.

The opening and closing of the throttle valve 400 will be described together with the behavior of the coil spring 450. When the throttle valve 400 opens the intake passage 320 in order to increase the engine speed, the other spring end 452 of the coil spring 450 contacts the body hook 307 and stays in its position. On the other hand, the one spring end 451 comes into contact with a valve gear hook 213 of the valve gear 210 and moves in accordance with the rotation of the valve gear 210 (i.e. rotation of the throttle shaft 430). In response to this movement, the coil spring 450 applies a returning force to the throttle shaft 430, the valve gear 210, and eventually the motor 100.

On the other hand, when the throttle valve 400 closes the intake passage 320 to have the engine in the idling state, the throttle shaft 430 rotates from the intermediate opening degree to the fully closed position. In this case, in contrast to the fully opening direction, the one spring end 451 of the coil spring 450 contacts the body hook 305 and stays in its position. Then, the other spring end 452 comes into contact with the valve gear hook 213 and moves according to the rotation of the throttle shaft 430. FIG. 1 shows a state in which the throttle valve 400 closes the intake passage 320, and FIG. 2 shows a state in which the throttle valve 400 opens the intake passage 320.

Next, a manufacturing method (manufacturing process) of the electronic throttle device 1 having the above-described configurations will be described. The body 300 is formed from aluminum or an aluminum alloy by die casting. The throttle shaft 430 is made by cutting stainless steel into a rod shape. The intermediate shaft 203 is also made by cutting stainless steel into a rod shape.

Figure 6:
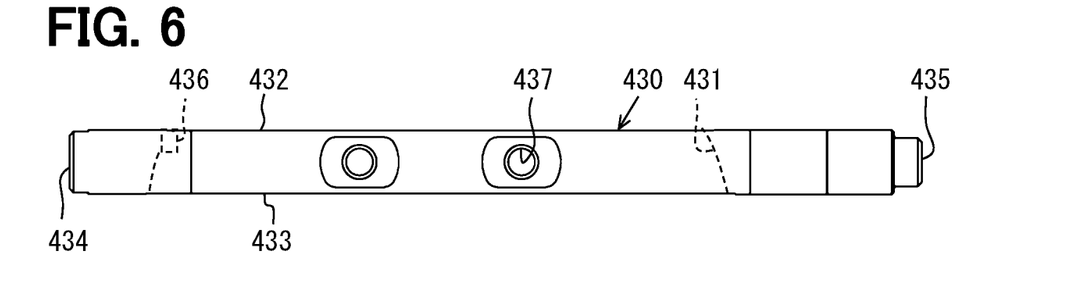
FIG. 6 is a front view of a shaft.
Figure 7:
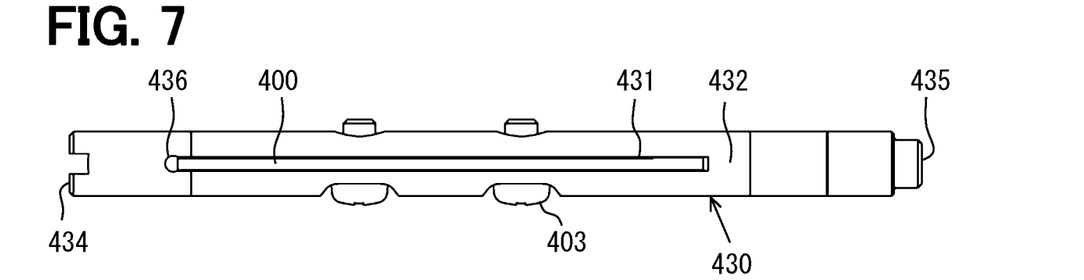
FIG. 7 is a top view of the shaft shown in FIG. 6.

As shown in FIGS. 6 and 7, a slit 431 is formed in the throttle shaft 430 for accommodating the throttle valve 400. The width of the slit 431 is substantially the same as the thickness of the throttle valve 400. For example, when the thickness of the throttle valve 400 is about 1.6 mm, the width of the slit 431 is about 1.7 mm. Therefore, "the width of the slit 431 and the thickness of the throttle valve 400 are substantially the same" in the present disclosure means that a gap is provided in the slit 431 so that the throttle valve 400 can be inserted into the slit 431. The size of this gap is set to be equal to or larger than the tolerance so that the throttle valve 400 can be reliably inserted into the slit 431.

The slit 431 passes through the throttle shaft 430 from a one lateral side 432 (upper side in FIG. 6) to another lateral side 433 (lower side in FIG. 6) of the throttle shaft 430. In FIGS. 6 and 7, the left side of the throttle shaft 430 is one end part 434, and the right side of the throttle shaft 430 is another end part 435. In the present disclosure, prior to forming of the slit 431, a round end hole 436 is formed on the one lateral side 432 of the throttle shaft 430 near the one end part 434 by drilling. The hole diameter of the round end hole 436 is equal to or slightly larger than the width of the slit 431. For example, when the width of the slit 431 is about 1.7 mm, the diameter of the round end hole 436 is about 2 mm. Although the diameter depends on the size of the slit 431, the diameter of the round end hole 436 is equal to the width of the slit 431 or larger than the width of the slit 431 by 30% of the width of the slit 431 or less. The depth of the round end hole 436 is about 2.5 mm. The round end hole 436 may have a cylindrical shape.

Figure 8:
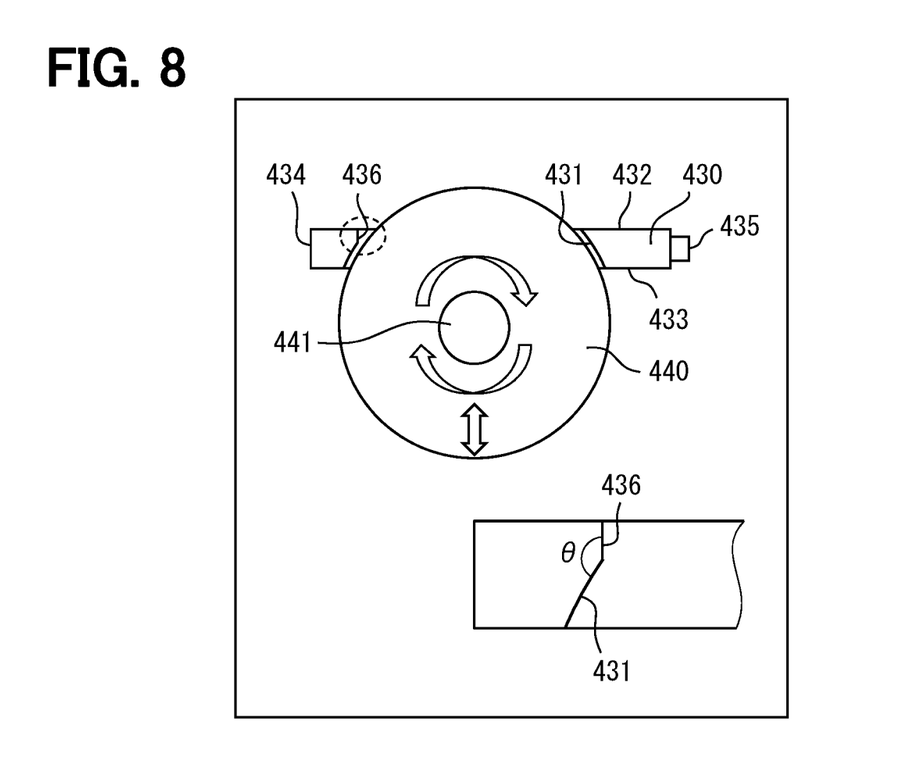
FIG. 8 is a diagram illustrating a slit forming process.

As shown in FIG. 8, after forming the round end hole 436, the throttle shaft 430 is fixed, and the slit 431 is formed by cutting with a cutter 440. The cutter 440 is made of cemented carbide, has a disk shape, and has a large number of cutting blades on its outer circumference. The cutter 440 rotates about 700 to 800 times per minute and supplies cutting oil to the cutting blades.

The cutter 440 rotates while moving from the other lateral side 433 of the throttle shaft 430 toward the one lateral side 432, thereby forming the slit 431 by cutting. The rotation direction is clockwise in FIG. 8. Relative to the throttle shaft 430, the cutting is performed in the direction in which the blade (shown in FIG. 10) moves from the one end part 434 to the other end part 435.

The diameter of the cutter 440 is larger than the diameter of the throttle valve 400 so that a central shaft 441 does not interfere with the throttle shaft 430. For example, when the diameter of the throttle valve 400 is about 45 mm, the diameter of the cutter 440 is 58 mm. In the shape of the slit 431, a length of the slit 431 in an axial direction of the throttle shaft 430 is referred to as an axial length of the slit 431. As described above, since the cutter 440 has the disk shape, the axial length of the slit 431 is longer on the other lateral side 433 than on the one lateral side 432.

If the diameter of the cutter 440 is much larger than the diameter of the throttle valve 400, the axial length of the slit 431 becomes too long on the other lateral side 433 as compared with the one lateral side 432. On the contrary, if the diameter of the cutter 440 is too close to the diameter of the throttle valve 400, the central shaft 441 will interfere with the throttle shaft 430. Therefore, in the present disclosure, the diameter of the cutter 440 is larger than the diameter of the throttle valve 400 by 10% to 40% of the diameter of the throttle valve 400. In the above example, the diameter of the cutter 440 is about 30% larger than the diameter of the throttle valve 400.

Figure 9:
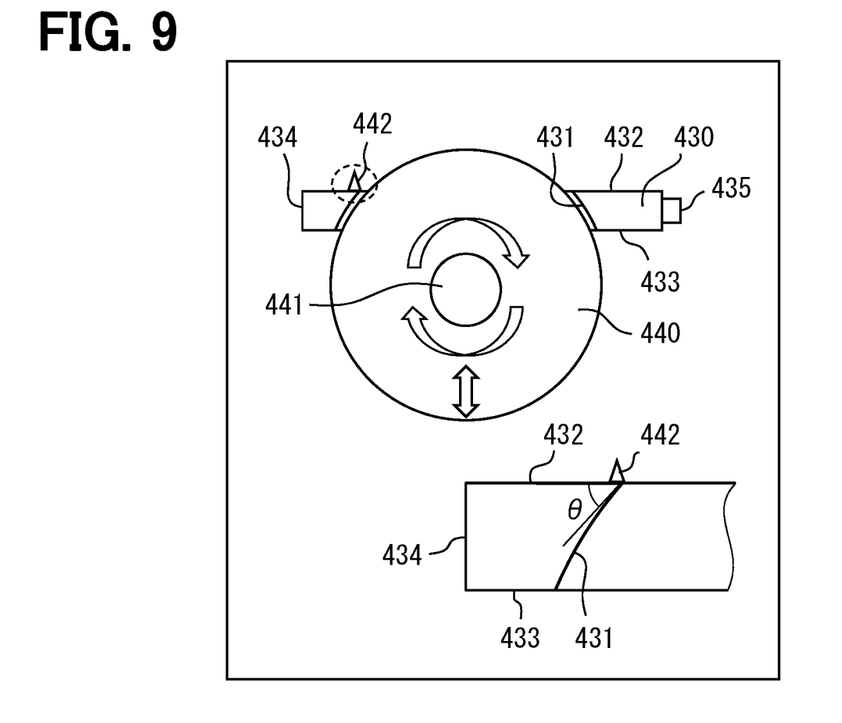
FIG. 9 is a diagram illustrating a comparative example of the slit forming process.

FIG. 9 is a comparative example in the case where the round end hole 436 is not provided. When the round end hole 436 is not provided, the chamfer angle θ between the slit 431 and the one lateral side 432 of the throttle shaft 430 is an acute angle at the end of forming of the slit 431. As a result, burrs 442 are generated on the one lateral side 432 of the slit 431.

Figure 10:
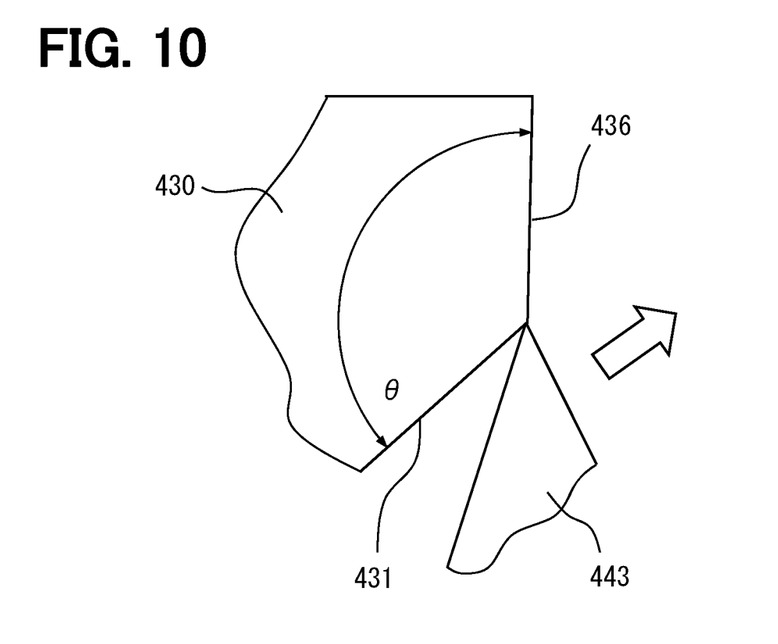
FIG. 10 is a diagram illustrating a chamfer angle of a cutter cutting surface.
Figure 11:
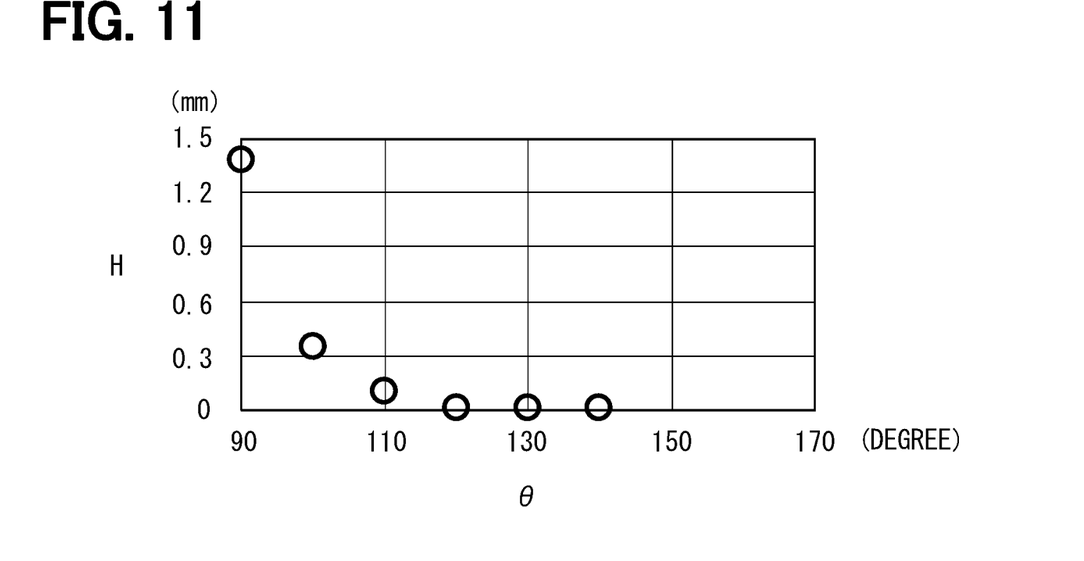
FIG. 11 is a diagram illustrating a relationship between the chamfer angle and a burr height.

On the other hand, in the present disclosure, since the round end hole 436 is provided, the chamfer angle θ between the slit 431 and the one lateral side 432 of the throttle shaft 430 at the end of forming of the slit 431 is an obtuse angle. FIG. 10 illustrates the relationship between the rotation direction of the blade 443 of the cutter 440 and the chamfer angle θ. FIG. 11 shows examples in which the chamfer angle θ and the height H of the burr 442 are measured by use of an actual machine.

In FIG. 11, the chamfer angle θ is on the horizontal axis, and the height H of the burr 442 is on the vertical axis. As shown in FIG. 11, when the chamfer angle θ is a right angle, a burr 442 having a height H of about 1.4 mm is generated. On the other hand, when the chamfer angle θ is an obtuse angle, the height H of the burr 442 can be reduced to about 0.3 mm even at 100 degrees of the chamfer angle θ. When the chamfer angle θ is 110 degrees, the height H of the burr 442 decreases to about 0.1 mm. When the chamfer angle θ is 120 degrees or more, the burrs 442 hardly occur.

From the measurement examples of the actual machine, the chamfer angle θ may be 100 degrees or more. When the chamfer angle θ exceeds 110 degrees, the height H of the burr 442 can be reduced to the extent that there is no practical problem. Further, the chamfer angle θ may be 120 degrees or more.

As described above, the shape of the slit 431 is determined by the diameter of the cutter 440. Thus, the size of the chamfer angle θ depends on the shape of the round end hole 436. First, the depth of the round end hole 436 needs to be deeper than a position at which the round end hole is in contact with the slit 431. Then, the depth is required to be set so that the chamfer angle θ of the slit 431 is equal to or greater than a predetermined angle. If the round end hole 436 is passed through the throttle shaft 430 from the one lateral side 432 to the other lateral side 433, the chamfer angle θ becomes 180 degrees. However, the round end hole 436 passing through the throttle shaft 430 from the one lateral side 432 to the other lateral side 433 is not practical because this extends the cutting process unnecessarily.

Here, the upper limit of the chamfer angle θ is determined by the depth, the axial position, and the diameter of the round end hole 436. Therefore, in the present disclosure, when the diameter of the round end hole 436 is about 2 mm and the width of the slit 431 is about 1.7 mm, and the depth is set to half or less of the diameter of the throttle shaft 430. The depth of the round end hole 436 may be 40% of the diameter of the throttle shaft 430 or less. When the depth of the round end hole 436 is half the diameter of the throttle shaft 430, the chamfer angle θ is about 150 degrees. In the above-exemplified depth of about 2.5 mm, the chamfer angle θ is about 120 degrees.

Accordingly, the round end hole 436 is determined so as to obtain a predetermined chamfer angle θ on the premise that the depth of the round end hole 436 is deeper than the position at which the round end hole 436 is in contact with the slit 431. More specifically, the depth, position in the axial direction, and diameter of the round end hole 436 can be determined by determining the diameter of the cutter 440 according to the diameter of the throttle valve 400, and then determining the chamfer angle θ. In other words, the depth, position in the axial direction, and diameter of the round end hole 436 are determined such that the chamfer angle θ becomes 100 degrees or more, and such that the depth of the round end hole 436 does not become deeper than necessary.

The depth of the round end hole 436 in the radial direction from the one lateral side 432 of the throttle shaft 430 may be 10% to 50% of the diameter of the throttle shaft 430. As described above, the shorter the depth of the round end hole 436, the easier the round end hole 436 is formed. Thus, the depth may be 40% of the diameter of the throttle shaft 430 or less. Since the diameter of the throttle shaft 430 is about 8 mm in this example, the depth of the round end hole 436 is about 30% of the diameter of the throttle shaft 430.

In the above process, the round end hole 436 and the slit 431 are formed in the throttle shaft 430. Then, a screw hole 437 is formed by drilling. The screw hole 437 extends in a direction orthogonal to the slit 431. The screw hole 437 can be formed before forming of the round end hole 436 and the slit 431. Further, the round end hole 436 may be formed before forming of the slit 431.

The positional relationship between the round end hole 436 and the bearings 405 (or bearing 406) is that the round end hole 436 does not contact the bearing 405 (or bearing 406).

An assembly process of the electronic throttle device 1 after the throttle shaft 430 is processed will be described below. First, the intermediate shaft 203 and the slide bearing 405 are press-fitted into the body 300. The ball bearing 406 is attached to the throttle shaft 430. Then, the throttle shaft 430 with the bearing 406 is attached to the body 300. In this assembled state, the one end part 434 of the throttle shaft 430 is rotatably supported by the slide bearing 405. The bearing 406 is supported by the body 300.

Then, the throttle valve 400 is inserted into the slit 431. The thickness of the throttle valve 400 is substantially the same as the width of the slit 431. However, as described above, since there is a gap larger than the tolerance, the insertion can be performed smoothly. In the state where the throttle valve 400 is inserted in the slit 431, the throttle valve 400 and the slit 431 are fixed by the screw 403. The outer diameter of the throttle valve 400 is substantially the same as the inner diameter of the intake passage 320 formed in the body 300. However, as described above, this "substantially the same" means that the inner diameter of the intake passage 320 is larger than the outer diameter of the throttle valve 400 by the tolerance or more. Further, the axial length of the slit 431 is larger than the outer diameter of the throttle valve 400 for insertion of the slit 431 into the slit 431.

Therefore, in the state where the throttle valve 400 is fixed in the slit 431, at least a part of the round end hole 436 is covered by the body 300. Since the inner diameter of the round end hole 436 is larger than the width of the slit 431 (i.e. thickness of the throttle valve 400), intake air may leak through the round end hole 436 and the slit 431. However, in the present disclosure, since the round end hole 436 is covered by the body 300, the leakage of the intake air can be reduced.

Next, the coil spring 450, the first guide 460 and the second guide 461 are assembled. Without a preload on the coil spring 450, the first guide 460 and the second guide 461 are separated away from each other by the coil spring 450. Even in this state, the annular portion 462 of the first guide 460 accommodates the one end surface 453 of the coil spring 450, and the guide hook 468 holds the one spring end 451. The annular portion 462 of the second guide 461 accommodates the other end surface 454 of the coil spring 450, and the guide hook 468 holds the other spring end 452.

From this state, a preload is applied to the coil spring 450. Accordingly, the guide hook 468 of the first guide 460 comes into contact with a spring receiver of the valve gear 210, and the guide hook 468 of the second guide 461 comes into contact with the body hook 305, 307 of the body 300. Then, the valve gear hook 213 of the valve gear 210 shown in FIG. 5 is arranged between the guide hook 468 of the first guide 460 and the guide hook 468 of the second guide 461.

Then, the lever 401 is fixed to the other end part 435 of the throttle shaft 430. This fixing is performed by press-fitting the lever 401 into the other end part 435, but instead of press-fitting, the fixing may be performed by swaging after insertion. Stress is generated on the throttle shaft 430 at the time of press-fitting or swaging the lever 401. The stress is likely to concentrate at corners. However, in the present disclosure, since the round end hole 436 is formed, the end of the slit 431 in the one end part 434 on the one lateral side 432 has a circular shape. Therefore, stress concentration can be prevented by the round end hole 436.

After the assembly of the throttle shaft 430 is completed, the motor 100 is arranged in the motor space 330. Next, the intermediate gear 201 is fitted to the intermediate shaft 203. Then, the open end 303 of the body 300 is closed with the cover 500 into which the rotation angle sensor 510 is incorporated in advance. The cover 500 is fixed to the body 300 with screws 502 shown in FIG. 2. Finally, various performance tests are performed, and then the opening 302 of the body 300 is closed with the plug 310.

The electronic throttle device 1 assembled as described above controls an amount of intake air of the engine as described above. During the control, pressure of the intake air is applied to the throttle valve 400. More specifically, a differential pressure between upstream atmospheric pressure and downstream negative pressure is applied to the throttle valve 400. The slit 431 of the throttle shaft 430 is subjected to the differential pressure applied to the throttle valve 400. Therefore, the stress is concentrated on the corner portion of the slit 431. However, in the present disclosure, since the round end hole 436 is provided, the stress concentration is reduced at least at the end of the slit 431 in the one end part 434 on the one lateral side 432 of the throttle shaft 430.

In the present disclosure, the round end hole 436 is formed at the end of the slit 431 in the one end part 434 on the one lateral side 432. However, the relationship between the one end part 434 and the other end part 435, and the relationship between the one lateral side 432 and the other lateral side 433 are determined by the relationship with the cutter 440 shown in FIG. 8. That is, the other lateral side 433 is a lateral side of the throttle shaft 430 from which the cutter 440 starts cutting. The one lateral side 432 is a lateral side of the throttle shaft 430 having a shorter axial length than the other lateral side 433 after completion of cutting of the cutter 440. Then, on the one lateral side 432, the one end part 434 is a backward end part of the throttle shaft 430 in a moving direction of the blade 443 of the cutter 440, and the other end part 435 is a forward end part of the throttle shaft 430 in the moving direction of the blade 443.

In other words, the portion where the burr 442 is generated in FIG. 9 is the end of the slit 431 in the one end part 434 on the one lateral side 432. In the example of FIG. 9, since the cutter 440 rotates clockwise, the left part of the throttle shaft 430 is the one end part 434. However, if the cutter 440 rotates counterclockwise, the right part of the throttle shaft 430 becomes the one end part 434.

In the example of FIG. 1, the bearing 405 is arranged on the one end part 434 and the lever 401 is arranged on the other end part 435, because the cutter 440 is rotated clockwise in the state of FIG. 9. If the cutter 440 rotates counterclockwise in the state of FIG. 9, the lever 401 is arranged on the one end part 434 and the bearing 405 is arranged on the other end part 435.

In the present disclosure, the round end hole 436 is formed at the end of the slit 431 in the one end part 434 on the one lateral side 432. However, round end holes may be provided at the other ends of the slit 431. In an example shown in FIGS. 12 and 13, the round end hole 436 is formed at the end of the slit 431 in the one end part 434 on the one lateral side 432. In addition, a second round end hole 4361 is formed at an end of the slit 431 in the other end part 435 on the one lateral side 432. A third round end hole 4362 is formed at an end of the slit 431 in the other end part 435 on the other lateral side 433. A fourth round end hole 4363 is formed at an end of the slit 431 in the one end part 434 on the other lateral side 433.

Figure 12:
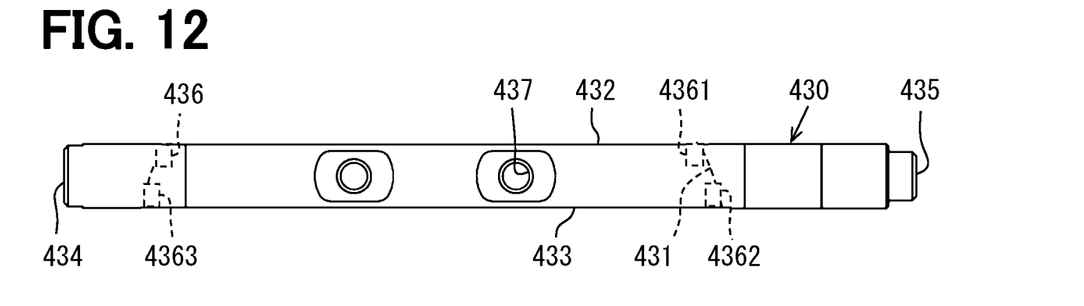
FIG. 12 is a front view showing another example of the shaft.
Figure 13:
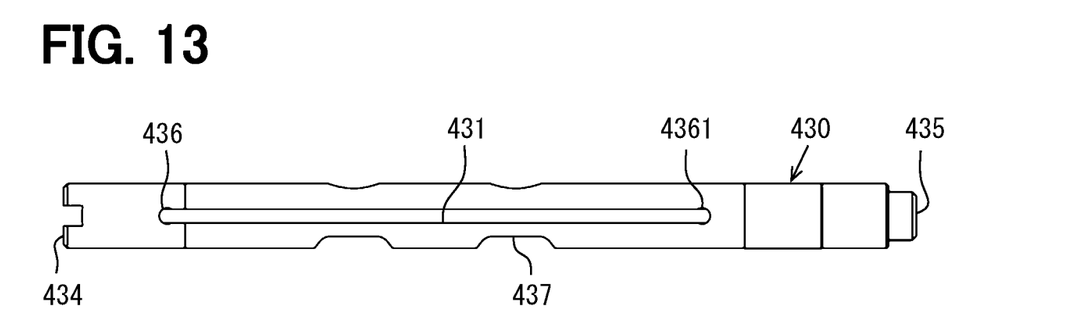
FIG. 13 is a top view of the shaft shown in FIG. 12.

Since the second round end hole 4361 and the fourth round end hole 4363 are the cutting start positions of the blade 443 of the cutter 440, burrs 442 do not occur at the second and fourth round end holes 4361 and 4363. The third round end hole 4362 is at a position where the blade 443 is separated from the throttle shaft 430. However, since the chamfer angle θ is an obtuse angle, the height H of the burr 442 is small at the third round end hole 4362. Therefore, the second round end hole 4361, the third round end hole 4362, and the fourth round end hole 4363 do not need to have the function of reducing the height H of the burr 442. However, the round end holes formed at the ends of the slit 431 can reduce stress during assembly and use.

Further, the second round end hole 4361, the third round end hole 4362 and the fourth round end hole 4363 are covered by the body 300 in the assembled state, similar to the round end hole 436. Therefore, even if a round end hole is formed at the end of the slit 431, leakage of intake air from that portion can be effectively reduced.

The above-described dimensions of the throttle valve 400 and the throttle shaft 430 are examples, and may be made larger or smaller depending on the performance required for the electronic throttle device 1. The above-described materials and dimensions of the components other than the throttle valve 400 and the throttle shaft 430 are also examples, and may be appropriately selected according to the requirements for the electronic throttle device 1.

As described above, the throttle valve device according to the present disclosure may be applicable in, for example, an electronic throttle device for controlling an amount of intake air of an engine, an EGR valve controlling a circulation amount of exhaust gas, an intake-passage pressure control valve controlling an intake air of a diesel engine, and a negative pressure control valve controlling a hydrogen concentration of a fuel cell.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements. In addition, while the various elements of the disclosure are shown in various combinations and configurations, which are exemplary, other various combinations and configurations, including more, less or only a single element, are also within the spirit of the disclosure.

What is claimed is:
1. A throttle valve device comprising:
   a body having a cylindrical passage;
   a shaft arranged in and orthogonal to the cylindrical passage of the body;
   a slit passing through the shaft on a central axis of the shaft from one lateral side to another lateral side of the shaft;

a pair of bearings provided on both sides of the cylindrical passage and rotatably supporting one end part and another end part of the shaft, the slit being between the pair of bearings; and a valve having a circular plate shape and inserted into the slit of the shaft, the valve being fixed to the shaft and rotatable together with the shaft to open and close the cylindrical passage, wherein a length of the slit on the other lateral side of the shaft is, in an axial direction of the shaft, longer than a length of the slit on the one lateral side of the shaft, and a round end hole is formed at least at an end of the slit in the one end part of the shaft on the one lateral side of the shaft.

2. A throttle valve device comprising:

a body having a cylindrical passage and a motor space;

a shaft arranged in and orthogonal to the cylindrical passage of the body;

a slit passing through the shaft on a central axis of the shaft from one lateral side to another lateral side of the shaft;

a pair of bearings provided on both sides of the cylindrical passage and rotatably supporting one end part and another end part of the shaft, the slit being between the pair of bearings;

a screw hole provided in the shaft and extending in a direction orthogonal to the slit;

a valve having a circular plate shape and inserted into the slit of the shaft, the valve being screwed to the shaft via the screw hole and rotatable together with the shaft to open and close the cylindrical passage; and a motor held in the motor space of the body and configured to rotate the shaft via a speed reduction mechanism in response to an electric signal, wherein an outer diameter of the valve is substantially the same as an inner diameter of the cylindrical passage, a width of the slit is substantially the same as a thickness of the valve, a length of the slit on the other lateral side of the shaft is, in an axial direction of the shaft, longer than a length of the slit on the one lateral side of the shaft, and a round end hole is formed at least at an end of the slit in the one end part of the shaft on the one lateral side of the shaft.

3. The throttle valve device according to claim 2, wherein an angle between an inner surface of the end of the slit in the one end part and the round end hole is in a range from 100 to 150 degrees.

4. The throttle valve device according to claim 2, wherein a diameter of the round end hole is equal to a width of the slit or than the width of the slit by 30% of the width of the slit or less, and a depth of the round end hole from the one lateral side of the shaft in a radial direction of the shaft is deeper than a depth at which the round end hole contacts the slit.

5. The throttle valve device according to claim 2, wherein at least a part of the round end hole is covered by the body.

6. The throttle valve device according to claim 2, wherein an angle between an inner surface of the end of the slit in the one end part and the round end hole is 120 degrees or more.

7. The throttle valve device according to claim 2, further comprising a lever fixed to the one end part or the other end part of the shaft, located outward of the pair of bearings in the axial direction, and configured to transmit rotation of the speed reduction mechanism to the shaft.

* * * * *